Aug. 5, 1924.
W. KAY
1,504,052
NIPPLE FOR WELL DRILLING
Filed Aug. 11, 1923
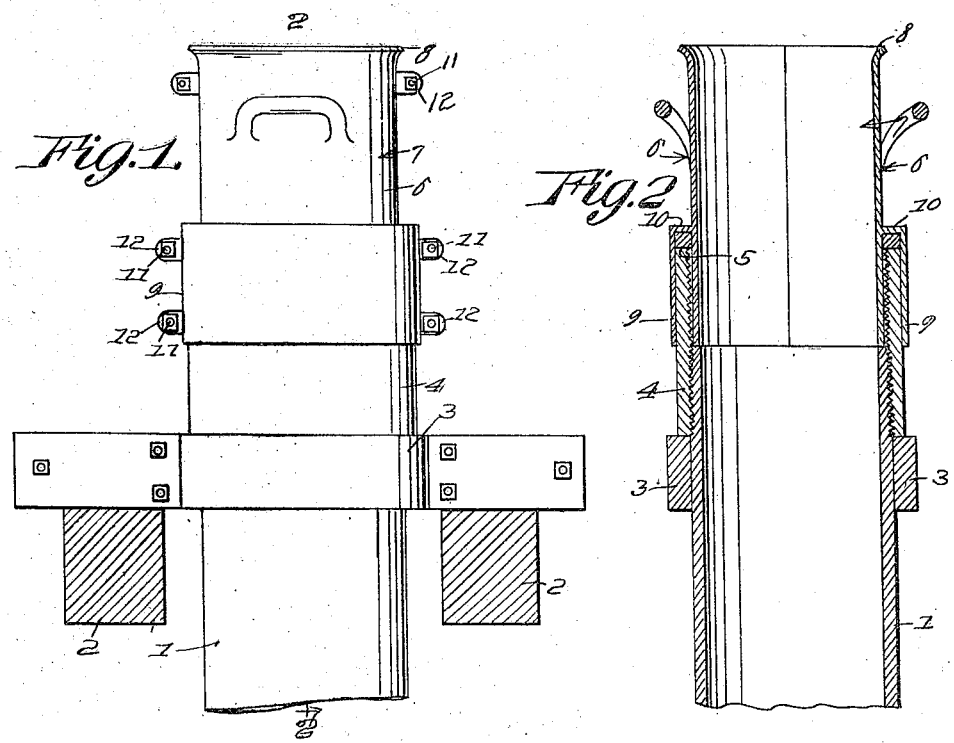
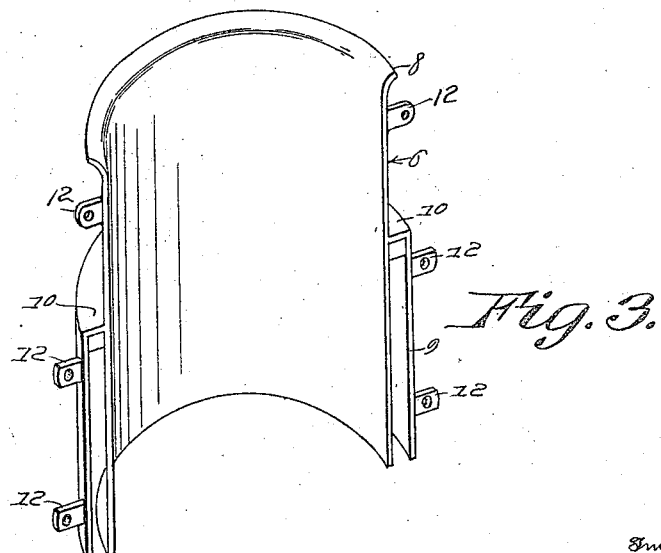
Inventor
Wilson Kay,
By
Attorneys Patented Aug. 5, 1924.

1,504,052

UNITED STATES PATENT OFFICE.

WILSON KAY, OF BRECKENRIDGE, TEXAS.

NIPPLE FOR WELL DRILLING.

Application filed August 11, 1923. Serial No. 656,894.

*To all whom it may concern:*

Be it known that WILSON KAY, a subject of the King of England, residing at Breckenridge, in the county of Stephens and State of Texas, has invented new and useful Improvements in Nipples for Well Drilling, of which the following is a specification.

The object of the invention is to provide a device adapted for use in well drilling operations and designed to take the place of the ordinary threaded nipple which is employed to protect the upper end of the well pipe during the operation of the drill preparatory to deepening the hole for the reception of a new length of pipe, the purpose principally being to provide a nipple which is readily detachable, which is simple in construction, and which may be continuously used in different well drilling operations, thereby having a much longer life of usefulness than the ordinary or conventional nipple.

With this object in view the invention consists in a construction and combination of parts of which a preferred embodiment is shown in the accompanying drawings, wherein:—

Figure 1 is a side elevational view showing a section of well pipe with the improved nipple attached to the upper end thereof.

Figure 2 is a section on the line 2—2 of Figure 1.

Figure 3 is a perspective view of one of the elements of which two constitute a complete nipple.

As the drilling operation progresses to provide for the reception of an additional length of pipe such as that shown at 1 in Figure 1 of the drawings, it is essential to support the column of pipe to prevent its following the drill into the drill hole and to this end there is usually provided a pair of sills 2 disposed one on each side of the well and spanned by the complemental clamp bars 3 embracing the upper end of the topmost section of pipe and abutting the coupling or pipe collar 4 secured to the upper end of the pipe section. In order that the threads in the interior of the collar 4 and that the upper edge 5 of the latter may not be damaged by the cable or by the drill when the latter is inserted after having been withdrawn for sharpening or the replacement of a new drill, a bushing is provided and the common plan is to provide a threaded bushing screwing into the collar or coupling 4 which necessitates, when a new length of pipe is to be added, the unscrewing of the bushing or nipple and the attachment of the new length of pipe. The bushing in the present instance comprises the complemental elements 6 which, when secured together constitute a thimble or nipple 7 flared outwardly at its upper edge as indicated at 8, the thimble extending into the coupling or collar 4 and its lower edge abutting the upper edge of the pipe section 1. Spaced from the thimble but surrounding the same there is a collar 9 which is secured to the thimble by means of a spacer 10 which is preferably welded to the thimble and to the collar, the spacer abutting the upper edge of the coupling 4. The thimble and its associated collar and spacer ring constitute complemental sections, the two sections are secured together by means of bolts 11 which pass through ears 12 formed on the collar 9 at the extremities of its sections. Obviously, when the bolts are loosened, the thimble may be slipped into the pipe collar or coupling 4 until the lower edge abuts the upper edge of the pipe section 1, the collar 9 heading down over the outside of the coupling 4. The bolts may then be tightened and the thimble as a whole screwed in place when the collar or coupling 4 is protected until it is time for the attachment of a new section of pipe when the thimble may be readily removed by the loosening of the bolts 11, to be attached to the extremity of the added section of pipe when the drilling operation is again continued.

Having described the invention, what is claimed as new and useful is:—

1. A device for the purpose indicated comprising a thimble and an associated exterior concentric collar spaced from the thimble, and means for effecting clamping engagement of the thimble and its collar exteriorly and interiorly of a pipe coupling or collar.

2. A device for the purpose indicated comprising a thimble and an exterior concentric collar spaced from the thimble, the thimble comprising complemental sections, and fastening means for securing the sections together and in clamping engagement with the exterior and interior surfaces of a pipe coupling.

3. A device for the purpose indicated comprising a thimble and an exterior concentric collar, a spacer ring welded to the exterior of the thimble and to the interior of the collar to space the latter from the thimble, the thimble and its collar constituting complemental sections of which the collar is provided with lateral ears at its extremities, and bolts passing through the ears to secure the sections together with the thimble in interior contact and the collar in exterior contact with a pipe coupling or collar.

In testimony whereof he affixes his signature.

WILSON KAY.